United States Patent
Brinker et al.

(10) Patent No.: US 12,116,923 B2
(45) Date of Patent: Oct. 15, 2024

(54) CONDUCTOR ELEMENT FOR A FLUID-COOLED COMPONENT OF AN INTERNAL COMBUSTION ENGINE

(71) Applicant: STELLANTIS AUTO SAS, Poissy (FR)

(72) Inventors: Michael Brinker, Rüsselsheim am Main (DE); Taoufik Marzouki, Rüsselsheim am Main (DE); Mathias Albrecht, Rüsselsheim am Main (DE)

(73) Assignee: STELLANTIS AUTO SAS, Poissy (FR)

( * ) Notice: Subject to any disclaimer, the term of this patent is extended or adjusted under 35 U.S.C. 154(b) by 0 days.

(21) Appl. No.: 18/559,746

(22) PCT Filed: Mar. 31, 2022

(86) PCT No.: PCT/EP2022/058525
§ 371 (c)(1),
(2) Date: Nov. 8, 2023

(87) PCT Pub. No.: WO2022/242948
PCT Pub. Date: Nov. 24, 2022

(65) Prior Publication Data
US 2024/0247607 A1    Jul. 25, 2024

(30) Foreign Application Priority Data
May 18, 2021   (DE) .................... 10 2021 205 021.2

(51) Int. Cl.
*F01P 11/04*       (2006.01)
*F01P 3/20*        (2006.01)
(Continued)

(52) U.S. Cl.
CPC ............... *F01P 11/04* (2013.01); *F01P 3/20* (2013.01); *F01P 7/14* (2013.01); *F01P 2060/04* (2013.01);
(Continued)

(58) Field of Classification Search
CPC ...... F01P 11/04; F01P 3/20; F01P 7/14; F01P 2060/04; F01P 2060/12; F02B 39/005
See application file for complete search history.

(56) References Cited

U.S. PATENT DOCUMENTS

| | | | |
|---|---|---|---|
| 6,213,062 B1 * | 4/2001 | Kawase | F01P 3/20 123/41.31 |
| 10,196,960 B2 | 2/2019 | Saindon et al. | |
| 2012/0003081 A1 * | 1/2012 | Woollenweber | F01D 5/082 415/180 |

FOREIGN PATENT DOCUMENTS

| | | | | |
|---|---|---|---|---|
| DE | 691 00 088 T2 | | 9/1993 | |
| DE | 102009012252 A1 * | | 9/2010 | ............. F01D 25/14 |

(Continued)

OTHER PUBLICATIONS

Https://www.amazon.com/EPMAN-Toyota-Turbo-Coolant-Flange/dp/B07GT71TM5/ref=sr_1_fkmr0_1crid=1U9SGYDELASZI&dib=eyJ2ljoiMSJ9.KYm4b4WyrBApINR_HZMNmhOjC7yzDLth-QuuQqOsjXGjHj071QN20LucGBJIEps.Pgu13Hut9CY4CKiHP-Z7-hLSwWoeSlgpwx6DoS2hpHE&dib_tag=se&keywords=epson+cgq224&qid=1723058299&sprefix=epman+cgq224%2 (Year: 2016).*
(Continued)

*Primary Examiner* — Syed O Hasan
(74) *Attorney, Agent, or Firm* — Sandberg Phoenix & von Gontard P.C.

(57) ABSTRACT

The invention relates to a line element (10) for a fluid-cooled turbocharger (20) of an internal combustion engine (30), having a supply line (11) for supplying cooling fluid to the turbocharger (30) and an outlet line for discharging cooling
(Continued)

fluid from the turbocharger (20), wherein the turbocharger (20) has an internal cooling fluid path (23) which has an inlet (21) which can be connected for fluid flow to the supply line (11), and an outlet (22) which can be connected for fluid flow to the outlet line (12), and wherein the supply line (11) is also connected to the outlet line (12) via a bypass connection (14, 15, 16).

12 Claims, 2 Drawing Sheets

(51) Int. Cl.
*F01P 7/14* (2006.01)
*F02B 39/00* (2006.01)

(52) U.S. Cl.
CPC ......... *F01P 2060/12* (2013.01); *F02B 39/005* (2013.01)

(56) References Cited

FOREIGN PATENT DOCUMENTS

| DE | 10 2012 205850 B4 | 12/2014 | | |
|---|---|---|---|---|
| DE | 10 2017 125412 A1 | 5/2018 | | |
| EP | 2100013 A2 | 9/2009 | | |
| EP | 2878786 A1 * | 6/2015 | ............. | F01D 25/12 |
| GB | 2419938 A | 5/2006 | | |

OTHER PUBLICATIONS

International Search Report corresponding to PCT/EP2022/058525 mailed on Aug. 8, 2022.
Written Opinion corresponding to PCT/EP2022/058525 mailed on Aug. 8, 2022.
"Epman CGQ224 Turbo Wasser Flansch Armatur zu-4 Eine Flare Turbo Feed Ablauf Flansch Kit: 3 Pages"; Retrieved from Internet at "https://www.amazon.de/-/en/EPMAN-cgq224-Turbo-Flansch-Armatur-zu-4-Eine/dp/B07GT71TM5?language=de_DE" on Nov. 7, 2023.

* cited by examiner

CONDUCTOR ELEMENT FOR A FLUID-COOLED COMPONENT OF AN INTERNAL COMBUSTION ENGINE

CROSS-REFERENCE TO RELATED APPLICATIONS

This application is the US National Stage under 35 USC § 371 of International Application No. PCT/EP2022/058525, filed Mar. 31, 2022, which claims the priority of the German application No. 10 2021 205 02.2 filed on May 18, 2021, the content (text, drawings and claims) of both said applications being incorporated by reference herein.

BACKGROUND

The disclosure relates to a line element for a fluid-cooled component of an internal combustion engine, comprising a supply line for supplying cooling fluid to the component, and an outlet line for discharging cooling fluid from the component.

DE102012205850B4 discloses an intercooler cooling fluid circuit which is coupled to a turbocharger of an internal combustion engine and is in fluidic communication therewith in order to circulate a flow of cooling fluid to the turbocharger, for the purpose of cooling the turbocharger. A turbocharger cooling control valve controls a fluid flow between the turbocharger and an intercooler. The turbocharger cooling control valve directs the flow of the cooling fluid to the intercooler when the engine is running, and directs the flow of cooling fluid to the turbocharger when the engine is not running. The vehicle uses an intermediate cooler pump for circulating the cooling fluid not only to the intercooler when the vehicle is running, but also to the turbocharger when the vehicle is not running.

SUMMARY

According to the present disclosure, a passive line element is specified which can be connected without active control elements to a component such as, for example, valves, and which makes it possible to direct a portion of a cooling fluid flow past the component.

A corresponding line element is specified in claim 1. The dependent claims form advantageous developments of the disclosure. The dependent claims can be combined with one another in a technologically reasonable manner. The description, in particular in connection with the figures, additionally characterizes and specifies the disclosure.

Accordingly, a line element for a fluid-cooled component of an internal combustion engine is provided, having a supply line for supplying cooling fluid to the component, and an outlet line for discharging cooling fluid from the component, wherein the component has an internal cooling fluid path which has an inlet which can be connected for fluid flow to the supply line, and an outlet which can be connected for fluid flow to the outlet line, and wherein the supply line is also connected to the outlet line via a bypass connection.

The component may be a bearing housing of a compressor, in particular a bearing housing of a compressor of a turbocharger. The internal cooling fluid path can run within a bearing housing of the compressor. The line element can be constructed in one piece or in multiple pieces. The line element can have connections to create fluid-conveying connections of flexible or rigid line sections. The fluid-conveying connection can be formed by a pipe connection with corresponding seals relative to interconnected elements. The pipe connection can have valves and branches. A fluid-conveying connection is provided when fluids can be conducted from one element into the following element. Water, in particular cooling water with antifreeze, can be used as the cooling fluid.

In one embodiment, the bypass connection is formed as a recess in the component between the inlet and the outlet, wherein one shared seal is provided which seals the inlet, the outlet and the recess relative to the surroundings.

By arranging the bypass connection in the component, for example in the bearing housing of the turbocharger, only a minimal change compared to a conventional connection is necessary for implementing the embodiment according to the claim. Only one recess needs to be cast or milled into the component or into the bearing housing.

In one embodiment, the bypass connection is designed as a recess in the line element in a flange for the mechanical and fluid-conveying connection of the supply line to the inlet, and also the outlet line to the outlet, wherein a shared seal is provided, which seal seals the flange and the bypass connection against the component.

As a result, in many applications in which a one-piece line element has previously been used, no changes at all to the component are necessary. Only the line element must be changed in the region of the supply line and outlet line.

In one embodiment, the bypass connection is designed as a line section which is arranged upstream of the supply line and downstream of the outlet line in the line element.

The line section is a pipe connection between the sections of the line element from which the supply and/or outlet lines extend to the component. The pipe connection can be rigid or flexible. The pipe connection may be dimensioned to achieve a certain ratio of a flow rate through the component compared to the flow rate through the pipe connection. Both the component and the pipe connection thus act as restrictors, and less as orifice plates. Accordingly, the volumetric flow conveyed by them depends only on a constant and on the pressure difference between the supply line and the outlet line. The intention is that a predominant proportion of cooling fluid flows past the component so that the component with the line section can be connected in series with components and coolers which require a much higher volumetric flow of cooling medium.

In one embodiment, it is therefore provided that a flow resistance of the bypass connection is lower than a flow resistance of the internal cooling fluid path of the component.

In a further embodiment, the flow resistance of the bypass is between 2 and 4 times, in particular 2.5 to 3.5 times, lower than the flow resistance of the internal cooling fluid path of the component for fluids having the density and viscosity of cooling water.

In one embodiment, the line element is arranged downstream of an oil cooler, wherein the oil cooler is designed to exchange a heat flow between engine oil from the internal combustion engine and the cooling fluid.

In this embodiment, one section of a cooling line can be used to cool both the oil cooler and the turbocharger. The oil cooler has a lower flow resistance than the turbocharger. A heat flow is exchanged between the cooling water and the engine oil in the oil cooler. By using the line element with the bypass connection, the turbocharger and the oil cooler can be arranged one behind the other in the run of a cooling line.

In one embodiment, downstream of the oil cooler, a water pump is provided for conveying cooling fluid through the oil cooler, the line element, and the component.

In order to prevent coking, the turbocharger can also be cooled after the operation of the internal combustion engine. An aging of the engine oil can also be slowed down if the accumulated heat in the internal combustion engine is dissipated after the operation thereof. In operation, a volumetric flow of cooling fluid can in turn be controlled on the basis of the actual cooling requirement of the oil cooler and of the turbocharger. If the temperature of the engine oil exceeds a threshold value, the delivery capacity of the pump can be increased. If the engine oil is still cold, no volumetric flow of cooling fluid is necessary at all.

BRIEF DESCRIPTION OF THE FIGURES

The drawings described herein serve for illustrative purposes only and are not intended to limit the scope of the present disclosure in any way. In the drawings.

DETAILED DESCRIPTION

Figure 1:
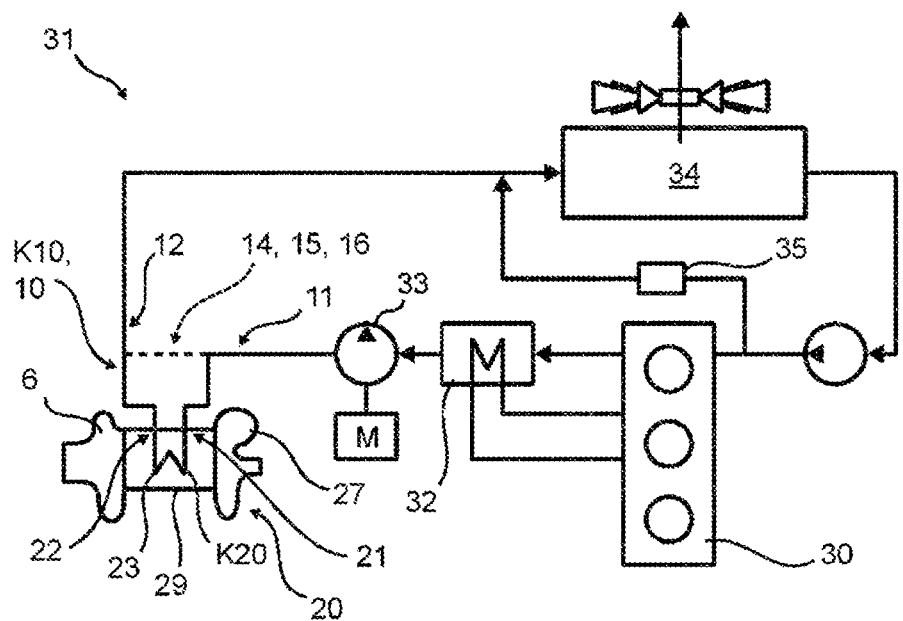
FIG. 1 shows schematically an internal combustion engine with a cooling fluid system which has a cooling fluid side line which runs from the engine block of the internal combustion engine through an oil cooler and a bearing housing of a turbocharger, wherein the cooling fluid side line can be operated independently of a main cooling circuit of the internal combustion engine and can be controlled as required, i.e., depending on the cooling requirement in the oil cooler and the turbocharger.
Figure 2:
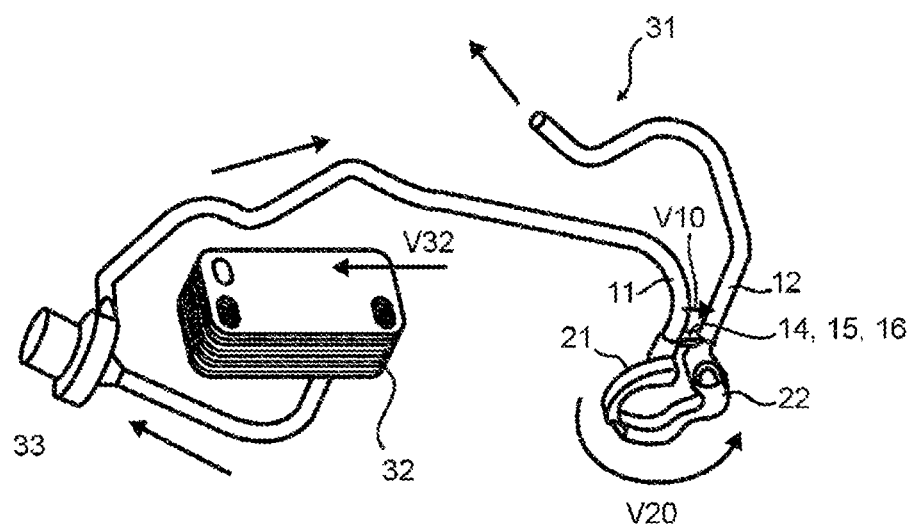
FIG. 2 shows schematically a cooling fluid system section for an internal combustion engine, comprising an additional electrical pump which conveys cooling fluid from an internal cooling fluid path in the internal combustion engine through an oil cooler and an internal cooling fluid path in a bearing housing of a turbocharger.

The following description is merely illustrative. For the sake of clarity, the same reference signs are used in the drawings for the designation of similar elements. The drawings are at least partially schematic. Further elements (not shown) such as valves, control elements, compressors, pumps and lines can be provided which complement the present elements. The use of the singular in relation to the valves is not to be understood as meaning that only one valve has to be provided at the corresponding position.

FIG. 1 schematically shows a cooling fluid circuit of an internal combustion engine 30. The cooling fluid circuit has a line which runs in a manner not shown through the internal combustion engine 30 or the engine block (not shown in detail). During operation, the internal combustion engine 30 outputs waste heat to a cooling medium which circulates in the cooling fluid circuit and can be discharged to the surroundings in a radiator 34. The cooling medium is conveyed continuously by a water pump (not shown) through the cooler and the internal combustion engine 30. During operation of the internal combustion engine, the water pump always runs in tandem therewith, even if the cooling medium is still cold. A switchable bypass 35 is provided, which can be opened in a temperature-dependent manner. The bypass is often referred to as a thermostat. If the cooling medium is not yet up to operating temperature, it will circulate in the engine block and thus be brought up to the necessary operating temperature more quickly.

Viewed in a flow direction of the cooling fluid out of the internal combustion engine 30, a turbocharger 20 is arranged downstream of an oil cooler 32, wherein a heat flow between engine oil from the internal combustion engine 30 and the cooling fluid is exchanged in the oil cooler 32.

Downstream of the oil cooler 32, an additional electrical water pump 33 for conveying cooling fluid through the oil cooler 32 and a bearing housing of a turbocharger 20 is in turn provided.

A line element 10 having a supply line 11 for supplying cooling fluid to the bearing housing 29 and an outlet line 12 for discharging cooling fluid from the bearing housing is connected to the turbocharger 20 for this purpose. An integrated cooling circuit 23 is provided in the bearing housing and has an inlet 21 which can be connected for fluid flow to the supply line 11, and an outlet 22 which can be connected for fluid flow to the outlet line 12. The supply line 11 is also connected for fluid flow to the outlet line 12 via a bypass connection 14, 15, 16.

Figure 3:
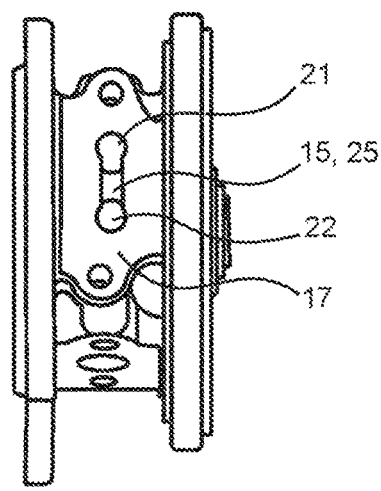
FIG. 3 shows a bearing housing of a turbocharger which corresponds to a bypass connection, wherein a recess in the component between the inlet and the outlet is formed in the bearing housing in a sealing surface.

A first embodiment of a bypass line 15 is shown in detail in FIG. 3. In the first embodiment of the bypass line 15, a recess 25 is provided in the bearing housing of the turbocharger 20. The inlet 21 is connected to the outlet 22 by the recess.

Figure 4:
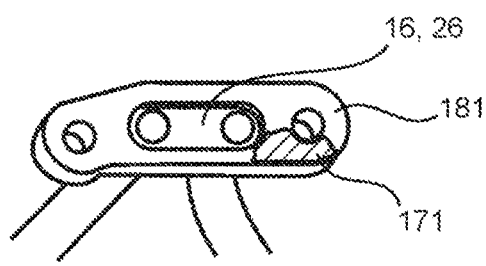
FIG. 4 shows a line element for supplying cooling water to a bearing housing of a turbocharger, wherein a recess is formed between a flange for connecting the supply line to the inlet and a flange for the fluid-conveying connection of the outlet line to the outlet.

A second embodiment of a bypass line 16 is shown in detail in FIG. 4. Here, the supply line 11 is connected to the outlet line 12 via a recess 26 in the line element.

Figure 5:
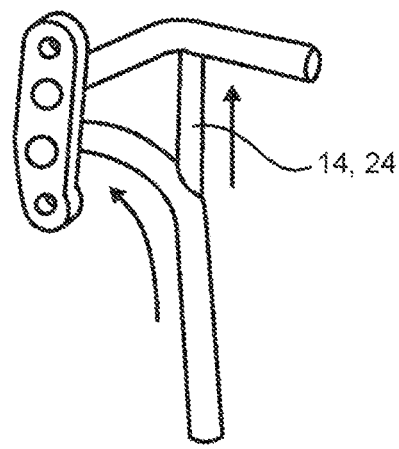
FIG. 5 shows a line section for supplying cooling water to a bearing housing of a turbocharger, wherein a bypass connection is designed as a line section which is arranged upstream of the supply line and downstream of the outlet line in the line element.

A third embodiment of a bypass line 14 is shown in detail in FIG. 5. A bypass is created here by providing a pipe connection 24 between the supply line 11 and the outlet line 12.

The purpose of the corresponding bypass lines 14, 15, and 16 is to use one and the same line section for cooling the turbocharger 20 as for the oil cooler 32. The volumetric flow $V_{32}$ flowing through the oil cooler 32 would per se be too high to be able to be guided through the bearing housing 29, since the cooling circuit 23 follows a jagged course in the bearing housing 29 and has curves which increase the flow resistance. Excess cooling medium can therefore be conveyed past the turbocharger 20 through the bypass connection.

As mentioned, FIG. 3 shows that the bypass connection 15 can be formed as a recess 25 in the bearing housing of the turbocharger 20 between the inlet 11 and the outlet 12, wherein one shared seal 17 is provided which seals the inlet 11, the outlet 12 and the recess 25 with respect to the surroundings. Via a flange (not shown), the line element 10 can be fastened to the bearing housing via the recess 25, wherein the inlet 11 and the supply line 21, and the outlet 12 and the outlet line 12, are connected to one another for fluid flow.

A corresponding flange is shown in FIG. 5, but in connection with a bypass connection which is provided as a pipe connection 24 between the supply line 11 and the outlet line 12. Such a bypass connection 14 is not provided in the embodiment shown in FIG. 3, since the recess 25 already forms a bypass here.

As mentioned, FIG. 4 shows that the bypass connection 16 can be designed as a recess 26 in the line element 10 in a flange 181 for the mechanical and fluid-conveying connection of the supply line 11 to the inlet 21 and the outlet line 12 to the outlet 22, wherein one shared seal 171 is provided which seals the flange 181 and the bypass connection 16 with respect to the bearing housing 29.

FIG. 5 shows that the bypass connection 14 can be designed as a pipe connection 24 which is arranged upstream of the supply line 11 and downstream of the outlet line 12 in the line element 10.

The bypass connections 14, 15, 16 have a flow resistance K10 which is lower than the flow resistance K20 of the internal cooling fluid path 23 of the bearing housing. The bypass connections 14, 15 and 16 can also be combined in order to cumulatively have the correspondingly lower flow resistance than the internal cooling fluid path 23.

The flow resistance K10 of the bypass connection 14, 15, 16 for fluids having the density and viscosity of cooling water is 2 to 4 times, in particular 2.5 to 3.5 times lower than the flow resistance K20 of the internal cooling fluid path 23 of the bearing housing. The volumetric flow V10, V20 through the bypass connection 14, 15, 16 and/or the cooling circuit 23 is found as the product of the pressure difference between the supply line and the outlet line and the corresponding flow resistance K10 or K20.

Although at least one embodiment was illustrated in the preceding description and the description of the figures, it should be noted that a large number of variations exists. Furthermore, it should be noted that the embodiment(s) are only examples, and they are not used to restrict the scope, applicability, or precise design in any way. Rather, the description and the description of the figures provide a useful instruction for implementing at least one embodiment for a person skilled in the art, in which case it should be clear that different changes can be made in the form and function of the described features without departing from the scope of protection of the claims and their equivalents.

LIST OF REFERENCE SIGNS

6 Compressor
10 Line element
11 Supply line
12 Outlet line
14 Bypass connection
15 Bypass connection
16 Bypass connection
17 Seal
20 Turbocharger
21 Inlet
22 Outlet
23 Cooling fluid path
24 Pipe connection
25 Recess
26 Recess
29 Bearing housing
30 Internal combustion engine
31 Cooling circuit
32 Oil cooler
33 Additional water pump
171 Seal
181 Flange
K10 Flow resistance
K20 Flow resistance
M Engine
V10 Volumetric flow
V20 Volumetric flow
V32 Volumetric flow

The invention claimed is:

1. A line element for a fluid-cooled component of an internal combustion engine, comprising a supply line for supplying cooling fluid to the component and an outlet line for discharging cooling fluid from the component, wherein the component has an internal cooling fluid path which has an inlet which can be connected for fluid flow to the supply line, and an outlet which can be connected for fluid flow to the outlet line, and wherein the supply line is also fluidically connected to the outlet line via a bypass connection, wherein
the bypass connection is formed as a recess in the component between the inlet and the outlet, wherein one shared seal is provided which seals the inlet, the outlet, and the recess relative to surroundings of the component;
a flow resistance of the bypass connection is lower than a flow resistance of the internal cooling fluid path of the component; and
the component is a bearing housing of a compressor for compressing air and for conveying air to the internal combustion engine.

2. A line element for a fluid-cooled component of an internal combustion engine, comprising a supply line for supplying cooling fluid to the component and an outlet line for discharging cooling fluid from the component, wherein the component has an internal cooling fluid path which has an inlet which can be connected for fluid flow to the supply line, and an outlet which can be connected for fluid flow to the outlet line, and wherein the supply line is also fluidically connected to the outlet line via a bypass connection, wherein
the bypass connection is designed as a recess in the line element in a flange for mechanically and fluidically connecting the supply line to the inlet and the outlet line to the outlet, wherein one shared seal is provided which seals the flange and the bypass connection relative to the component;
a flow resistance of the bypass connection is lower than a flow resistance of the internal cooling fluid path of the component; and
the component is a bearing housing of a compressor for compressing air and for conveying air to the internal combustion engine.

3. The line element according to claim 1, wherein the flow resistance of the bypass connection for fluids having the density and viscosity of cooling water is 2 to 4 times, in particular 2.5 to 3.5 times, lower than the flow resistance of the internal cooling fluid path of the component.

4. The line element according to claim 1, wherein the component has a turbine through which exhaust gas can be conveyed during operation of the internal combustion engine, said gas driving the turbine, wherein the turbine is connected to the compressor via a shaft mounted in the bearing housing.

5. A use of a line element according to claim 1 in a cooling circuit operated with fluid in an internal combustion engine.

6. The use of a line element in an internal combustion engine according to claim 5, wherein the line element is arranged downstream of an oil cooler, wherein the oil cooler is designed to exchange a heat flow between engine oil from the internal combustion engine and the cooling fluid.

7. The use of a line element according to claim 6, wherein, downstream of the oil cooler, an additional electrically operated water pump is provided for conveying cooling fluid through the oil cooler, the line element, and the component.

8. The line element according to claim 2, wherein the flow resistance of the bypass connection for fluids having the density and viscosity of cooling water is 2 to 4 times, in particular 2.5 to 3.5 times, lower than the flow resistance of the internal cooling fluid path of the component.

9. The line element according to claim 2, wherein the component has a turbine through which exhaust gas can be conveyed during operation of the internal combustion engine, said gas driving the turbine, wherein the turbine is connected to the compressor via a shaft mounted in the bearing housing.

10. A use of a line element according to claim 2 in a cooling circuit operated with fluid in an internal combustion engine.

11. The use of a line element in an internal combustion engine according to claim 10, wherein the line element is arranged downstream of an oil cooler, wherein the oil cooler is designed to exchange a heat flow between engine oil from the internal combustion engine and the cooling fluid.

12. The use of a line element according to claim 11, wherein, downstream of the oil cooler, an additional electrically operated water pump is provided for conveying cooling fluid through the oil cooler, the line element, and the component.

\* \* \* \* \*